United States Patent [19]

Ishikawa

[11] 4,136,584
[45] Jan. 30, 1979

[54] AUTOMATIC TRANSMISSION FOR AUTOMOBILES

[75] Inventor: Kazuo Ishikawa, Ichinomiya, Japan

[73] Assignee: Aisin Seiki Kabushiki Kaisha, Kariya, Japan

[21] Appl. No.: 794,631

[22] Filed: May 6, 1977

[30] Foreign Application Priority Data

May 11, 1976 [JP] Japan .................................. 51-54021

[51] Int. Cl.² ........................................... B60K 41/06
[52] U.S. Cl. ..................................................... 74/867
[58] Field of Search ................ 74/867, 856, 857, 687, 74/730, 733, 864; 192/109 F

[56] References Cited

U.S. PATENT DOCUMENTS 3,691,872  9/1972  Schaefer et al. ...................... 74/864
4,046,162  9/1977  Rodeghiero ................. 102/109 F X Primary Examiner—Benjamin W. Wyche
Assistant Examiner—Frank H. McKenzie, Jr.
Attorney, Agent, or Firm—Finnegan, Henderson, Farabow & Garrett

[57] ABSTRACT

Automatic transmission for automobiles including a hydraulic torque converter and a transmission gear mechanism which has a plurality of friction devices such as clutch and brakes whereby a plurality of different driving stages can be provided through selective actuation of the friction devices. Trimmer valve is provided for each actuator of the friction device to provide a supply of gradually increasing hydraulic pressure. The trimmer valve is applied at its return port with a pressure corresponding to the engine throttle valve position so that the initial pressure to be applied to the actuator is determined in accordance with the engine throttle valve position.

8 Claims, 18 Drawing Figures

FIG. 2

| RANGE | CLUTCH 18 | FIRST CLUTCH 41 | SECOND CLUTCH 42 | THIRD CLUTCH 43 | FIRST BRAKE 44 | SECOND BRAKE 45 | THIRD BRAKE 46 | FOURTH BRAKE 47 | SPEED RATIO |
|---|---|---|---|---|---|---|---|---|---|
| R | | | | O | | O | | | 4.53 |
| N | | | | | | | | | — |
| OD | O | O | | | O | | | | 0.82 |
| 4th | O | O | O | | | | | | 1.00 |
| 3rd | O | O | | | | | O | | 1.49 |
| 2nd | | | O | | | | O | | 2.23 |
| 1st | | | | O | | | O | | 3.72 |
| Low | | | | O | | | | O | ABOUT 5 |

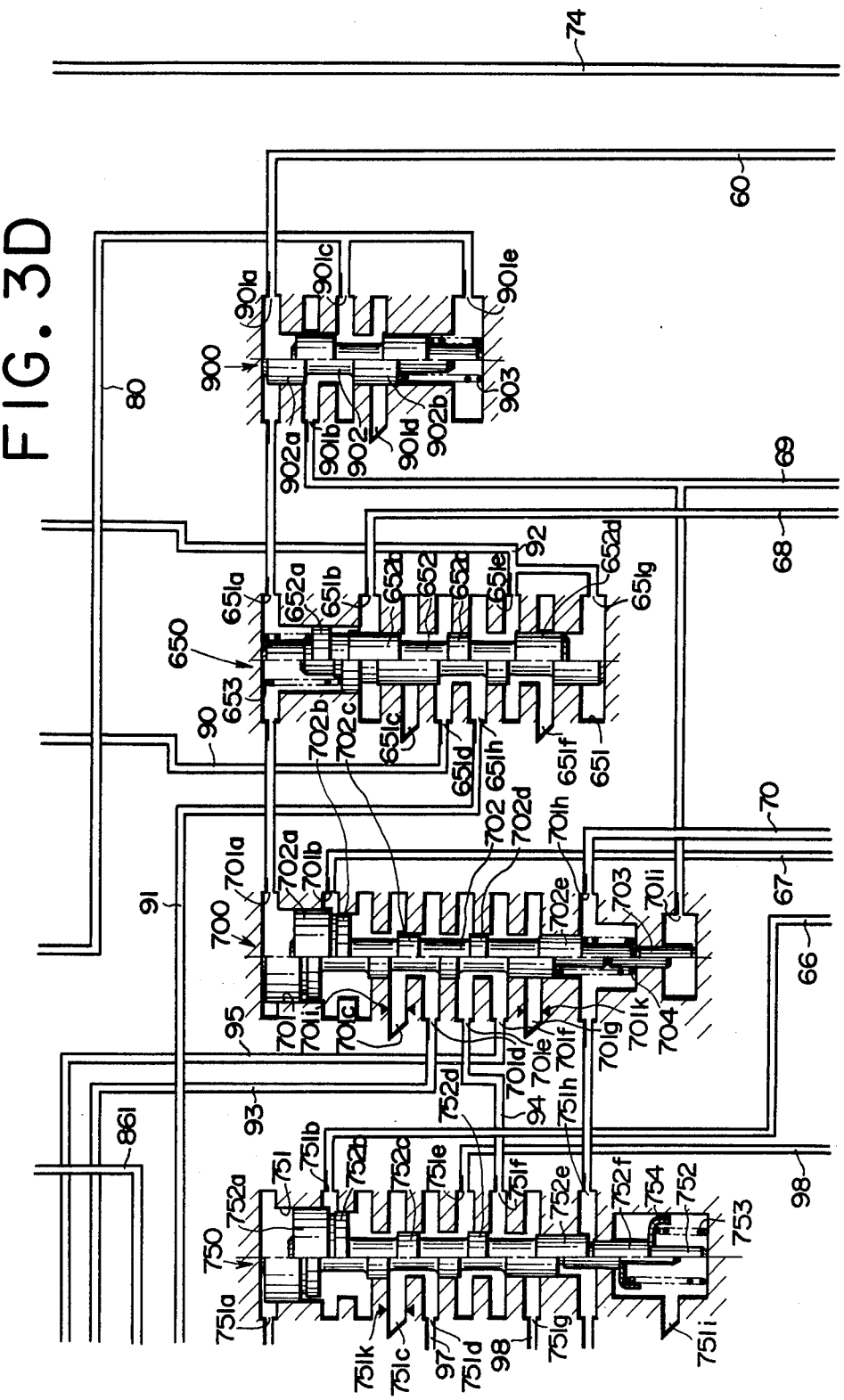

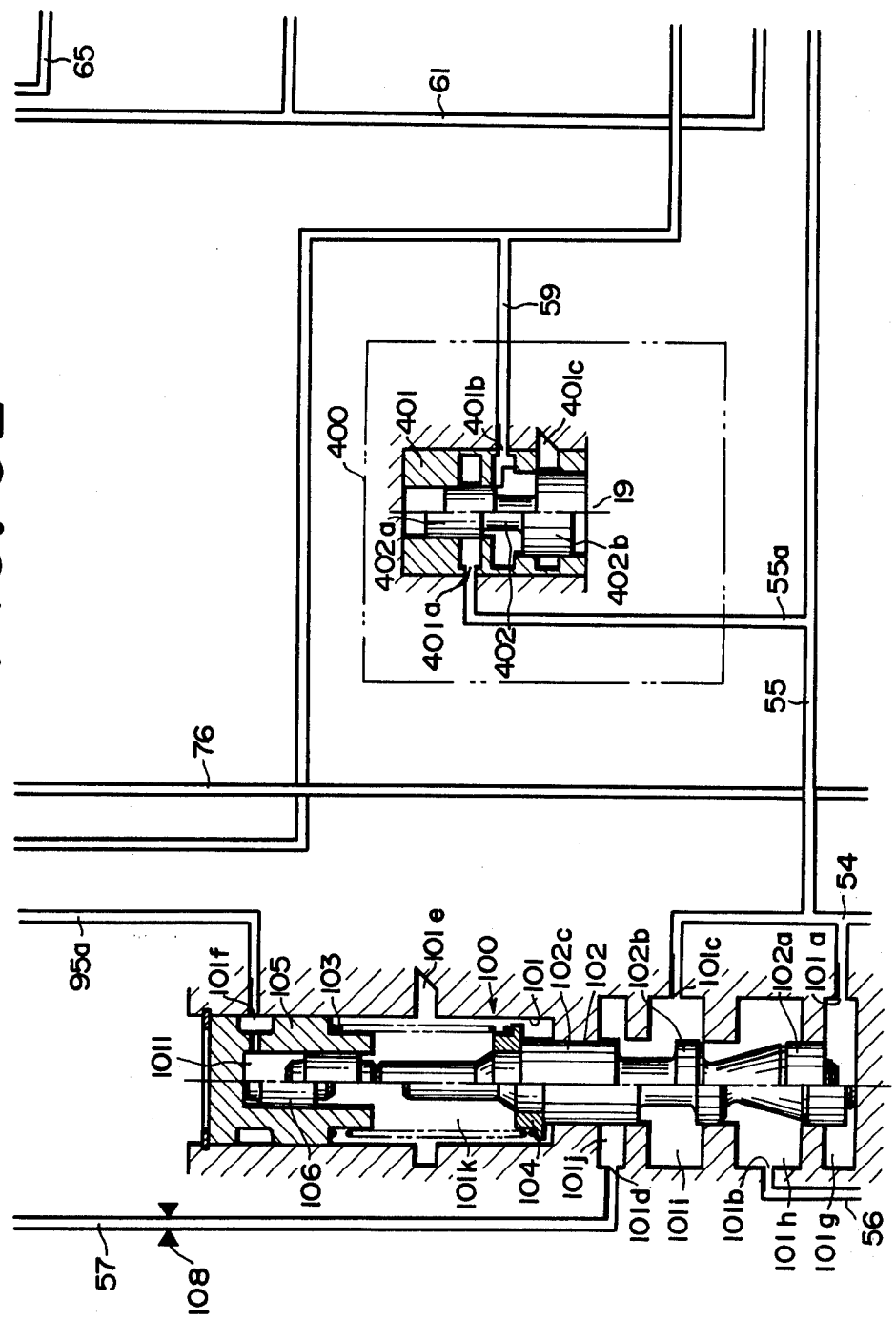

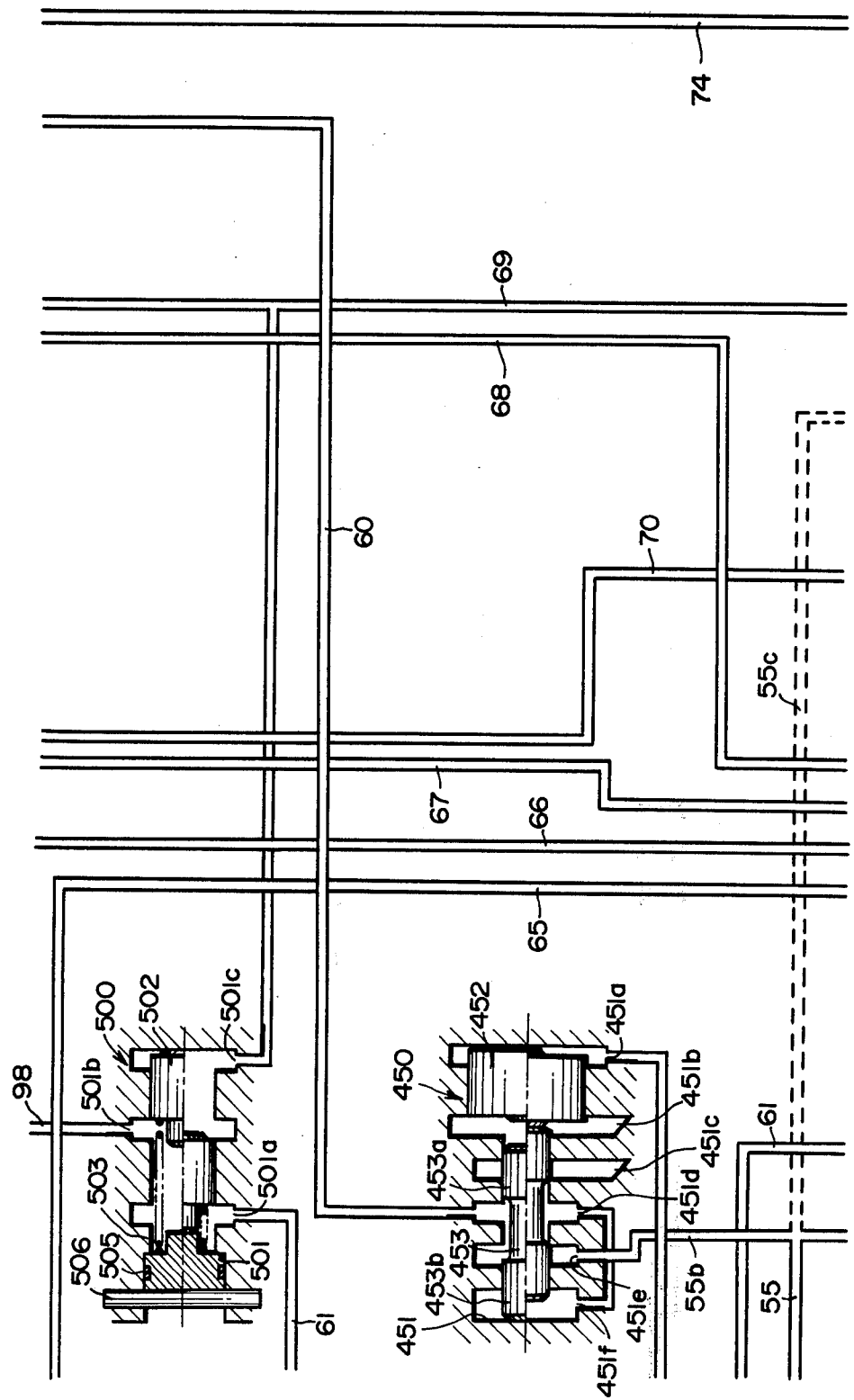

AUTOMATIC TRANSMISSION FOR AUTOMOBILES

The present invention relates to automatic transmissions for automobiles and more particularly to hydraulic control means for such automatic transmissions.

Conventional automatic transmissions for automobiles generally include a hydraulic torque converter having an input shaft adapted to be connected with the engine output shaft and an output shaft adapted to be connected with a transmission gear mechanism which is associated with one or more frictional constraining means such as brakes or clutches so as to provide a plurality of speed ratios. The brakes and clutches are selectively actuated by hydraulic actuators into engagement to provide the above plurality of speed ratios. The hydraulic pressure supplied to each of the actuators is controlled by a so-called hydraulic trimmer valve so that the pressure is gradually increased from the initial pressure in order to avoid a shock or rough engagement which may other wise be produced when the transmission gear mechanism is shifted.

Conventionally, the hydraulic trimmer valve includes a plunger which is positioned between a pressure line and a return line and biased by means of a spring toward a position where the pressure line is interrupted from communication with the return line. The plunger is further subjected to a pressure which corresponds to the engine throttle valve position and which acts on the plunger opposite to the biasing spring. Thus, the pressure line is opened to the return line by an amount corresponding to the engine throttle valve position to produce a modified pressure which is applied to the hydraulic actuator to operate the same. The modified pressure is also applied to the plunger of the trimmer valve to assist the biasing spring so that the opening from the pressure line to the return line is gradually decreased resulting in a gradual increase in the modified pressure.

According to the conventional structure, the throttle valve position pressure is applied to an end of the plunger so as to oppose to the biasing spring. In this arrangement, however, disadvantages have been encountered in that any movement of the plunger has an influence on the throttle valve position pressure and, since the throttle valve position pressure is usually used for controlling other valves which are employed for various purposes, fluctuation thus produced in the throttle valve position pressure often causes improper or erroneous operations of such valves.

It is therefore an object of the present invention to provide hydraulic control means for automatic transmissions which does not have the aforementioned disadvantages.

According to the present invention, the above and other objects can be accomplished by an automatic transmission for automobiles which comprises gear means having at least one frictional constraining means adapted for selective operation to provide a plurality of different speed ratios, actuator means associated with said constraining means, control circuit means including at least one hydraulic pressure line for the actuator means to provide a supply of operating pressure to said actuator means, said control circuit means further including at least one return line, trimmer valve means disposed between said hydraulic pressure line and said return line and including at least one valve member biased toward a first position wherein the hydraulic pressure line is blocked from communication with the return line, means for applying hydraulic pressure in the pressure line to the valve member so that the valve member is urged under the pressure toward a second position wherein the hydraulic pressure line is opened to the return line whereby the pressure in the hydraulic pressure line is allowed to leak into the return line to produce a modified pressure in the hydraulic pressure line, means for applying the modified pressure to the valve member so that the valve member is urged by the modified pressure toward the first position, and means for establishing in the return line a pressure corresponding to engine load.

According to the present invention, the actuator means is supplied with the modified pressure which increases gradually from the initial pressure. Since the return line is at the pressure corresponding to the engine load, the said initial pressure is determined in accordance with the engine load which may be represented by the engine throttle valve position. Since the pressure corresponding to the engine load is not applied directly to the valve member but maintained at the return line, the pressure is not affected by any movement of the valve member.

The above and other objects and features of the present invention will become apparent from the following descriptions of a preferred embodiment taking reference to the accompanying drawings, in which;

FIG. 2 is a chart showing the operations of brakes and clutches for providing various speed ratios in the transmission;

FIGS. 3A, 3B, 3C, 3D, 3E, 3F, 3G and 3H show respective parts of the hydraulic control circuits in accordance with the present invention;

Figure 1:
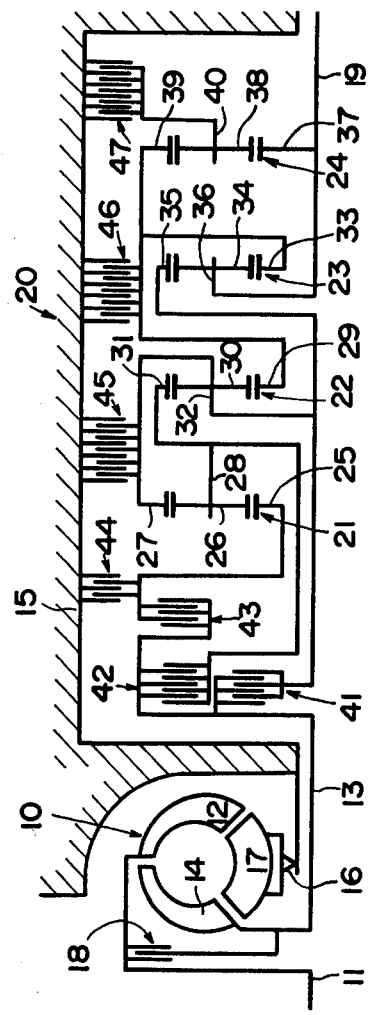
FIG. 1 is a schematic illustration of an automatic transmission to which the present invention can be applied.

Referring now to the drawings, particularly to FIG. 1, there is schematically shown an automatic transmission to which the present invention can be applied. The transmission includes a torque converter 10 and a transmission gear device 20. The torque converter 10 is of a conventional three element, single stage, two phase type and comprises a pump impeller 12 adapted to be connected with an engine output shaft 11, a turbine runner 14 and a stator wheel 17 mounted on a casing 15 through a one-way brake 16. Between the pump impeller 12 and the turbine runner 14, there is provided a lock-up clutch 18 for connecting them together so that the rotation of the engine output shaft 11 is mechanically transmitted to the transmission gear device 20.

The transmission gear device 20 includes an input shaft 13 which is adapted to be connected with the turbine runner 14 of the torque converter 10 and an output shaft 19 which is arranged coaxially with the input shaft 13. Between the input shaft 13 and the output shaft 19, there are disposed a first planetary gear device 21, a second planetary gear device 22, a third planetary gear device 23 and a fourth planetrry gear device 24, all of single pinion types.

The first planetary gear device 21 comprises a first sun gear 25, first planetary gears 26 meshing with the first sun gear 25, a first ring gear 27 meshing with the first planetary gears 26 and a first planetary carrier 28 rotatably supporting the first planetary gears 26. Similarly, the second planetary gear device 22 comprises a second sun gear 29, second planetary gears 30, a second ring gear 31 and a second planetary carrier 32. The third planetary gear device 23 also comprises a third sun gear 33, third planetary gears 34, a third ring gear 35 and a third planetary carrier 36. The fourth planetary gear device 24 comprises a fourth sun gear 37, fourth planetary gears 38, a fourth ring gear 39 and a fourth planetary carrier 40.

The first ring gear 27, the second planetary carrier 32 and the third ring gear 35 are connected together so that they rotate as a unit. Further, they are connected with the input shaft 13 through a first clutch 41. The first planetary carrier 28 and the second ring gear 31 are connected together so that they rotate as a unit. The first planetary carrier 28 and the second ring gear 31 are also connected with the input shaft 13 through a second clutch 42.

The first sun gear 21 is so arranged that it is driven by the input shaft 13 through a third clutch 43 and adapted to be locked on the case 15 through a first brake 44. The first ring gear 27, the second planetary carrier 32 and the third ring gear 35 are so arranged that they can be locked on the case 15 by means of a second brake 45. The second sun gear 22, the third sun gear 33 and the fourth ring gear 39 are connected together so that they can rotate as a unit and further they are so arranged that they can be locked on the case 15 through a third brake 46. The fourth planetary carrier 40 can be locked on the case 15 through a fourth brake 47. The third planetary carrier 36, the fourth sun gear 37 and the output shaft 19 are connected together so that they rotate as a unit.

In the gear transmission device 20 described above, the engagements of the third clutch 43 and the fourth brake 47 provide a LOW drive stage wherein the slowest forward drive is attained. The simultaneous actuation of the third clutch 43 and the third brake 46 provides a first forward drive stage. A second forward drive stage is provided through a simultaneous actuation of the second clutch 42 and the third brake 46. A third forward drive stage is provided through a simultaneous actuation of the first clutch 41 and the third brake 46 and a fourth forward drive stage is provided through a simultaneous actuation of the first and the second clutches 41 and 42. In the fourth forward drive stage, the input shaft 13 and the output shaft 19 rotate as a unit at the same speed. An overdrive stage can be provided through a simultaneous actuation of the first clutch 41 and the first brake 44 and, in this stage, the output shaft 19 is driven faster than the input shaft 13. A reverse drive stage is provided when the third clutch 43 and the second brake 45 are simultaneously engaged. The above functions are shown in FIG. 2 wherein the mark O designates the engagement of the associated clutch or brake.

The above automatic transmission is controlled by a hydraulic control device including a hydraulic pump 50, a regulator valve 100, a manually operated valve 150, a down-shift control valve 200, an engine throttle position responsive valve 250, a kick-down control valve 300, a LOW-HIGH shift valve 350, a governor valve 400, a governor modulator valve 450, a shift valve 500, an engine throttle position modulating valve 550, a torque converter pressure control valve 600, a L-1 shift valve 650, a 1-2 shift valve 700, a 2-3 shift valve 750, a 3-4 shift valve 800, an OD shift valve 850, a reverse inhibitor valve 900, a fourth brake trimmer valve 950, a third brake trimmer valve 1000, a second brake trimmer valve 1050, a first brake trimmer valve 1100, a third clutch trimmer valve 1150, a second clutch trimmer valve 1200 and a first clutch trimmer valve 1250.

Figure 3:
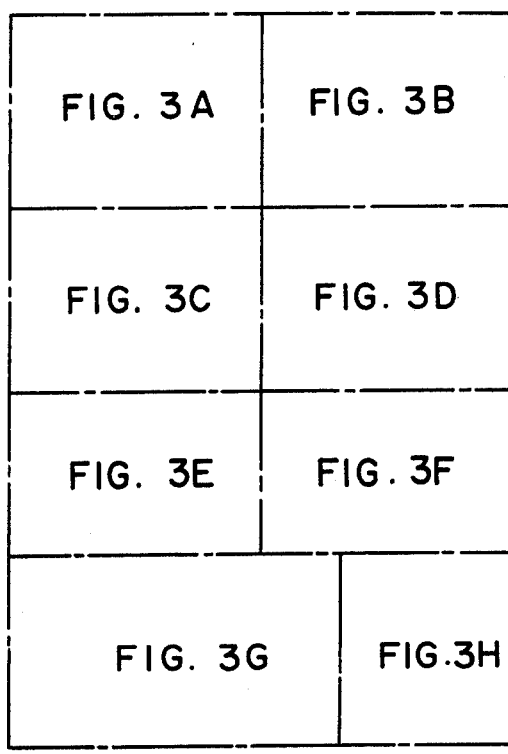
FIG. 3 is a diagramatical illustration of general arrangements of several component which are used in the transmission assembly including the hydraulic control system in accordance with the present invention and illustrated in detail in subdivided FIGS. 3A to 3H.
Figure 3A:
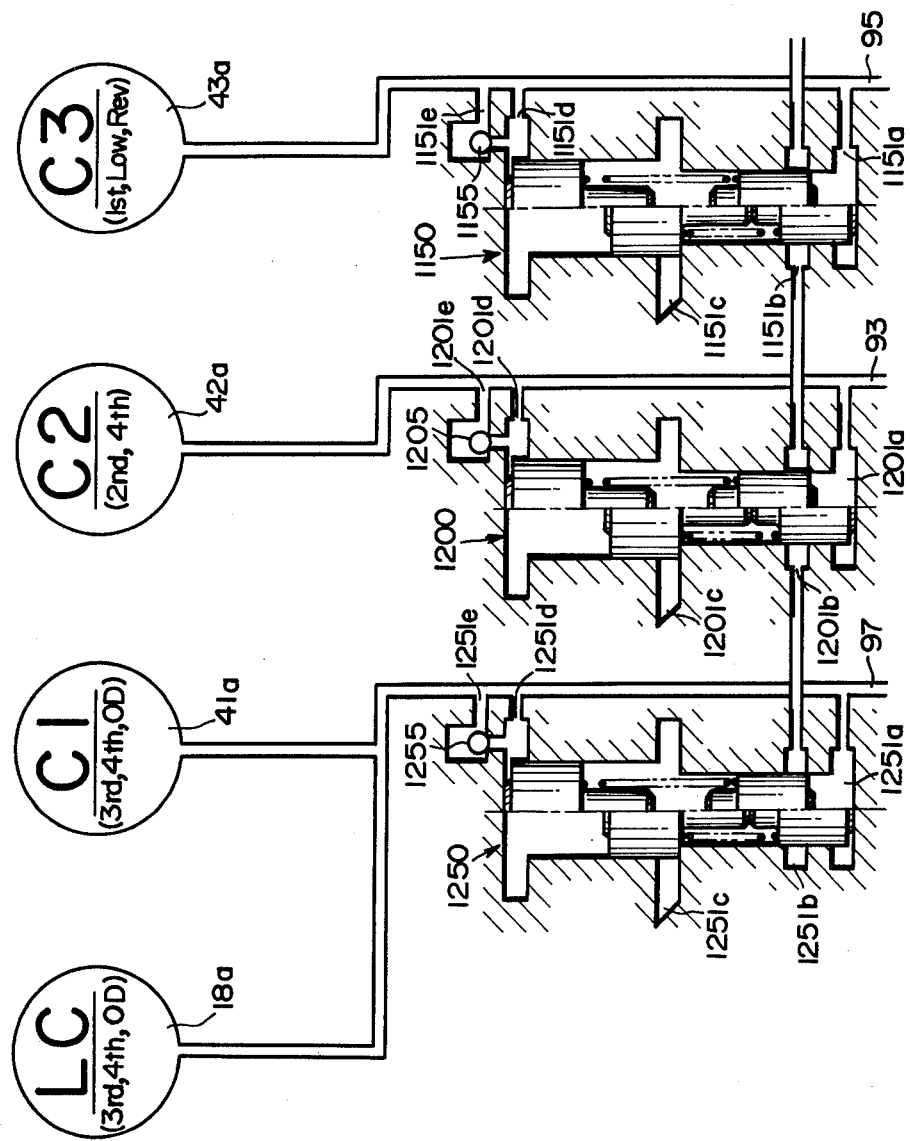
Figure 3B:
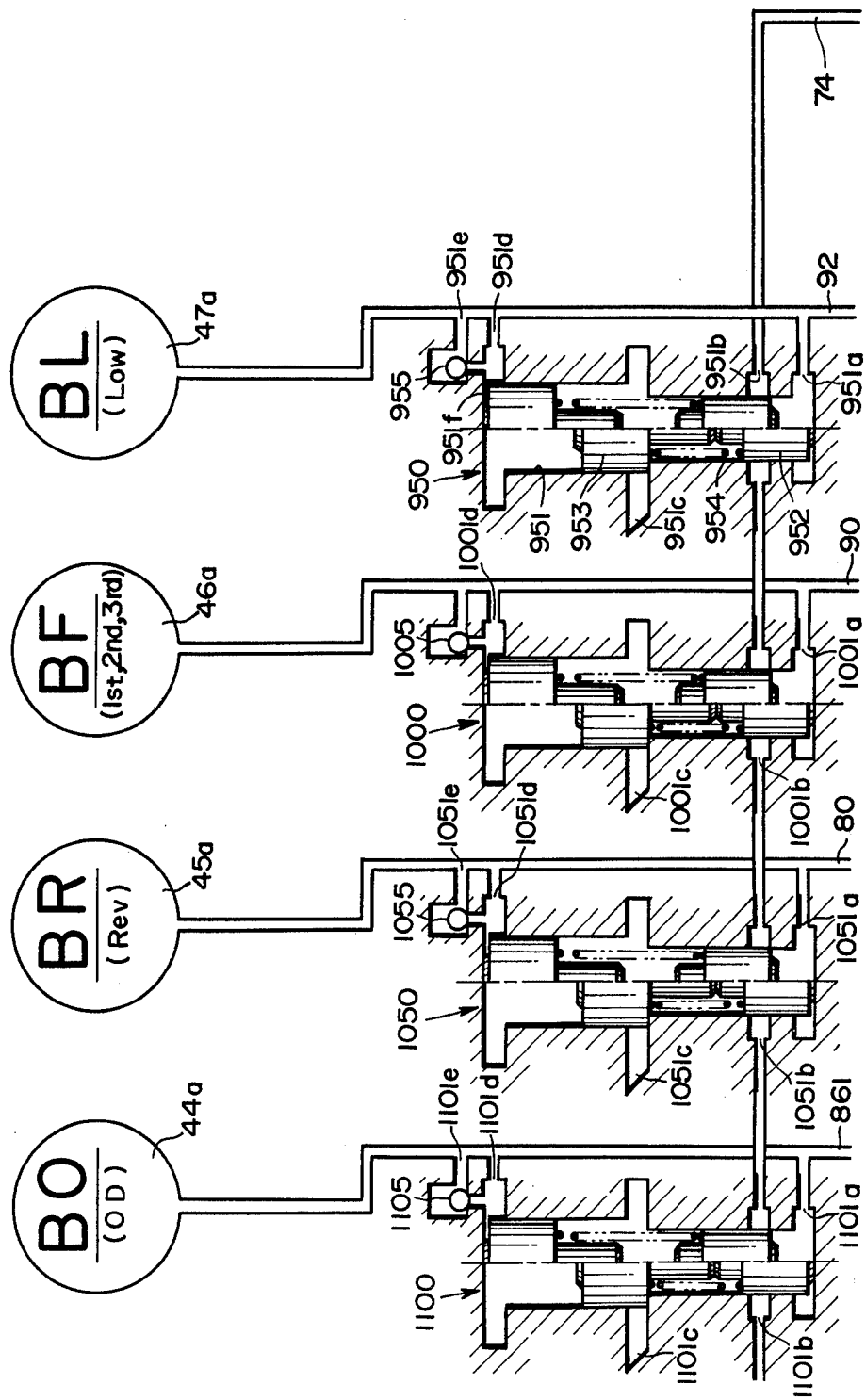
Figure 3C:
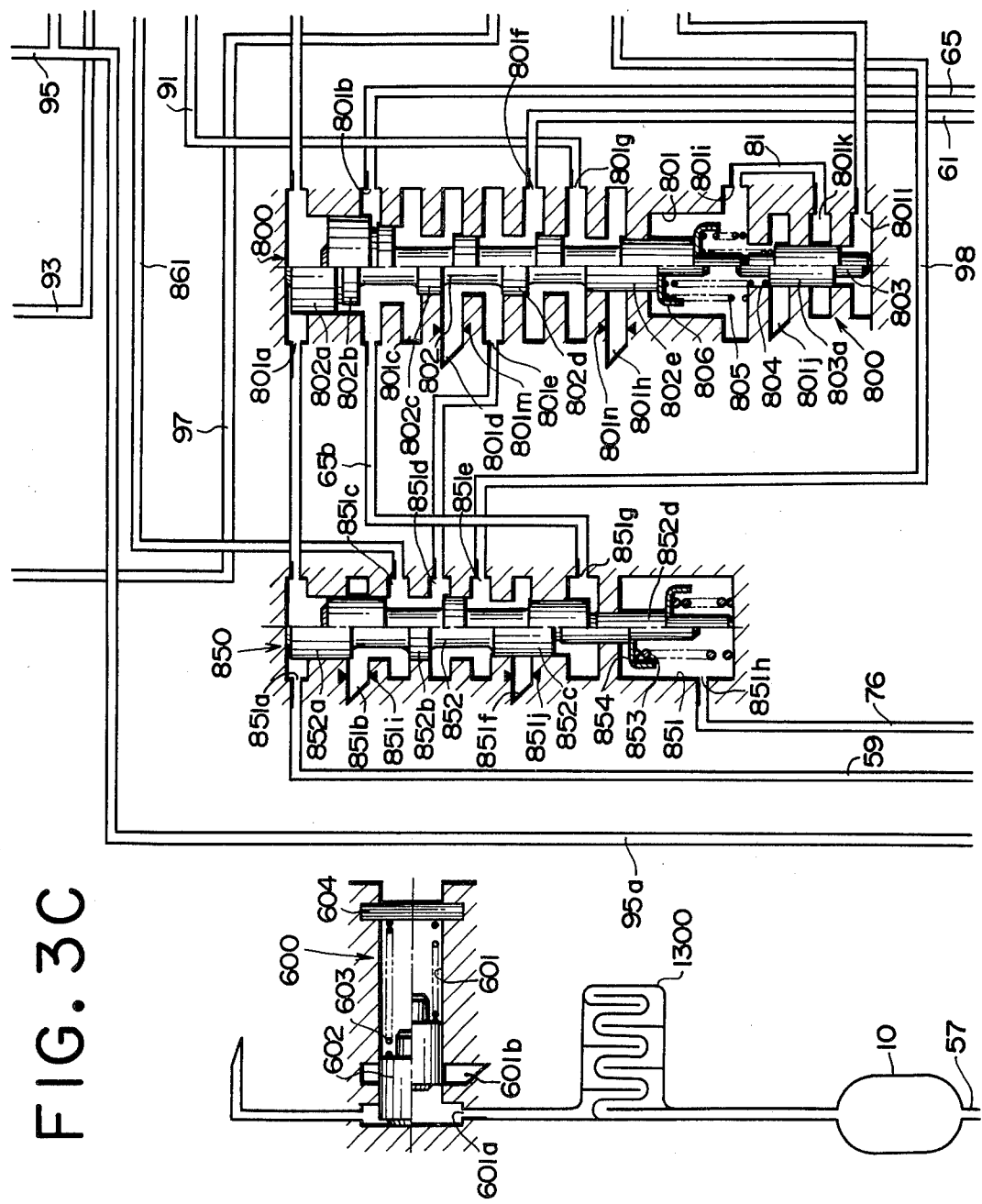
Figure 3G:
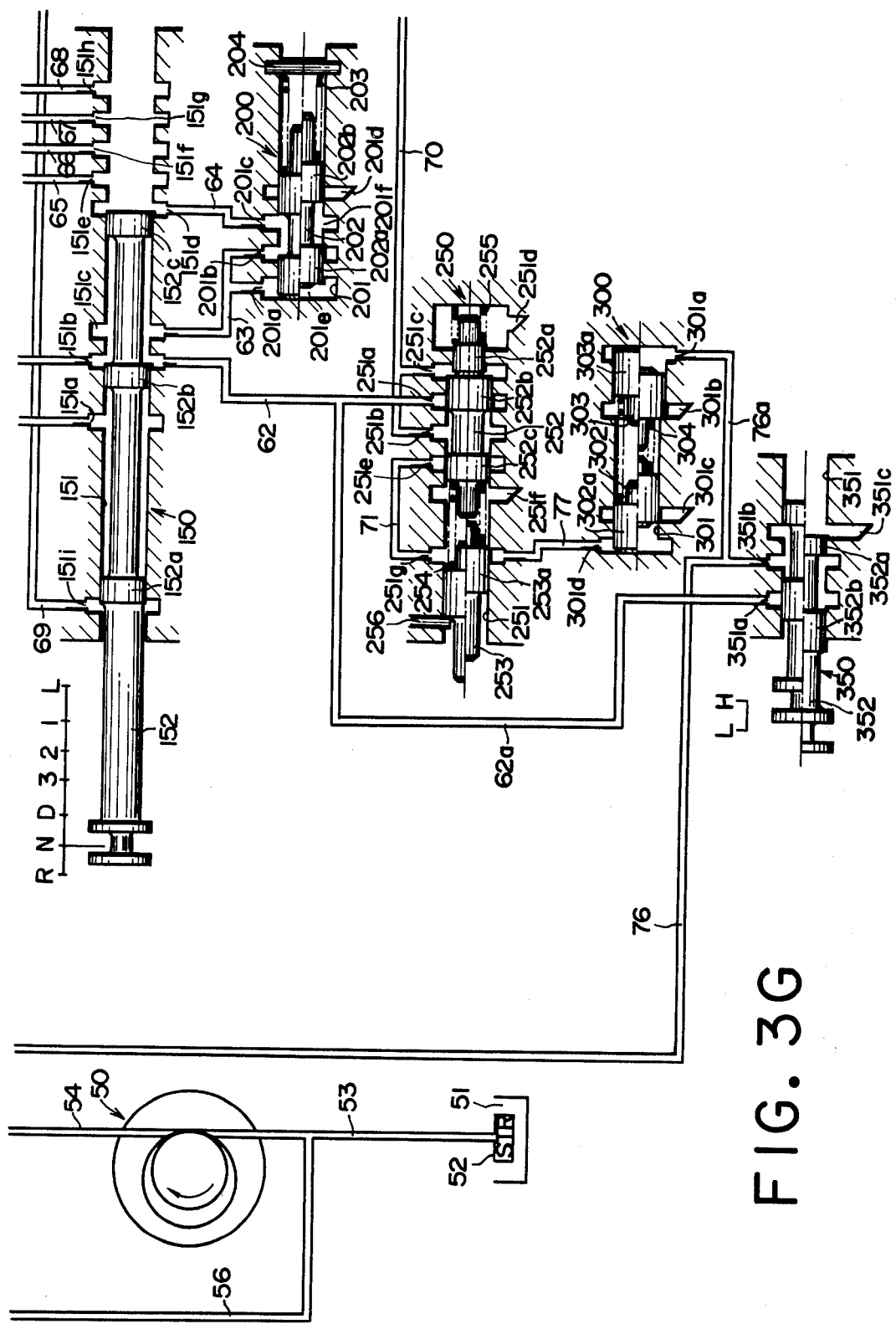

Referring to FIG. 3G, the hydraulic pump 50 in connected through an inlet conduit 53 having a strainer 52 with an oil reservoir 51 so that hydraulic oil is introduced through the conduit 53. The pump 50 is also connected with an outlet conduit 54 to which the hydraulic oil is discharged under pressure from the pump 50. The pump 50 is connected through the pump impeller 12 of the torque converter 10 with the engine output shaft 11 to receive a driving power therefrom.

Referring to FIG. 3E, the pump outlet conduit 54 is connected with a pressure line 55 which leads to the regulator valve 100. The passage 55 provides a supply of hydraulic pressure for affecting angagement of the friction devices such as the clutches 41, 42 and 43 and the brakes 44, 45, 46 and 47 to provide the aforementioned functions of the transmission gear device 20. The regulator valve 100 serves to regulate the pressure in the passage 55.

The regulator valve 100 includes a valve body 101 having a valve bore in which a valve member 102 is axially slidably received. The valve member 102 has axially spaced lands 102a, 102b and 102c and is biased by means of a spring 103 which extends between a spring seat 104 provided on the valve member 102 and a sleeve 105 fitted in the bore of the valve body 101. The sleeve 105 has an axially extending bore in which a plug 106 is slidably but fluid-tightly received.

The valve body 101 is provided at axially spaced portions with ports 101a, 101b, 101c, 101d and 101e and chambers 101g, 101h, 101i, 101j and 101k respectively communicating with the ports. The port 101a is connected with the line 54 so as to introduce the line pressure into the chamber 101g whereby the line pressure is applied to the adjacent end surface of the valve member 102. The port 101b functions as a return port and connected through a passage 56 to the pump inlet passage 53. The port 101e is also connected with the oil reservoir 51.

The port 101c is connected with the passages 54 and 55. The port 101d is connected through a passage 57 having an orifice 108 with the torque converter 10 so as to supply hydraulic oil thereto. The valve body 101 is further provided with a port 101f which communicates with a chamber 101l defined in the sleeve 105 by means of the plug 106.

The line pressure passage 55 has a branch passage 55a which leads to the governor valve 400. The governor valve 400 comprises a valve body 401 having axially spaced ports 401a, 401b and 401c and a valve member 402 received in an axial bore of the valve body 401. The port 401a is connected with the branch passage 55a to receive the line pressure. The valve member 402 has a smaller land 402a and a larger land 402b. The port 401c is connected with the oil reservoir 51.

The valve body 401 is mounted on the output shaft 19 of the gear device 20 in such a manner that its axis is directed in the radial direction of the output shaft 19 with the smaller land 402a positioned at the radially outside. The port 401b is connected with a passage 59 which leads to the governor modulator valve 450, the OD shift valve 850, the 3-4 shift valve 800 and the 2-3 shift valve 750.

Referring to FIG. 3F, the governor modulator valve 450 comprises a valve body 451 having an axial bore formed with ports 451a, 451b, 451c, 451d, 451e and 451f, a piston 452 slidably inserted at the right hand portion of the bore and a plunger 453 slidably inserted into the bore and having axially spaced lands 453a and 453b which have diameters smaller than that of the piston 452. The port 451a is connected with the passage 59 and the ports 451b and 451c are connected with the reservoir 51. The port 451e is connected with the branch passage 55c so as to receive the line pressure therefrom. The ports 451d and 451f are connected together and the port 451d is connected with the reverse inhibitor valve 900, the L-1 shift valve 650 and the 1-2 shift valve 700.

As shown in FIG. 3G, the manually operated valve 150 includes a valve body 151 having an axial bore provided with ports 151a, 151b, 151c, 151d, 151e, 151f, 151g, 151h and 151i and a valve member 152 disposed in the axial bore of the valve body 151 and having axially spaced lands 152a, 152b and 152c.

The port 151a is connected with the line pressure passage 55 and the port 151b is connected with a passage 61 which leads to the 3-4 shift valve 800 and the shift valve 500, and also with a passage 62 which leads to the engine throttle position valve 250 and the L-H shift valve 350. The port 151c is connected with a passage 63 leading to the down-shift control valve 200.

The port 151d communicates with a passage 64 which leads to the down-shift control valve 200 and the port 151e with a passage 65 leading to the 3-4 shift valve 800 and the OD shift valve 850. The port 151f communicates with a passage 66 which leads to the 2-3 shift valve 750 and the port 151g with a passage 67 leading to the 1-2 shift valve 700. The port 151h is connected with a passage 68 which leads to the L-1 shift valve 650, and the port 151i with a passage 69 leading to the shift valve 500, the 1-2 shift valve 700 and the reverse inhibitor valve 900.

Referring to FIG. 3G, the down-shift control valve 200 includes a valve body 201 having an axial bore provided with ports 201a, 201b, 201c and 201d, and a valve member 202 slidably received in the axial bore of the valve body 201. The valve member 202 has axially spaced lands 202a and 202b and biased toward left by means of a spring 203 which acts between a pin 204 and the valve member 202.

The port 201d is a return port and connected with the reservoir 51. The ports 201a and 201b are connected with the passage 63 from the port 151c in the manually operated valve 150 so as to receive the hydraulic pressure therefrom. The port 201a is in communication with a chamber 201e to which the left end of the valve member 202 is exposed so that the hydraulic pressure is introduced through the port 201a into the chamber 201e. Thus, the valve member 202 is forced toward right against the action of the spring 203.

A chamber 201f is defined in the axial bore of the valve body 201 between the lands 202a and 202b and is always in communication with the port 201c which is connected through the passage 64 with the port 151d in the manual valve 150. The port 201b is opened to the chamber 201f when the valve member 202 is moved toward left under the action of the spring 203 but blocked from communication with the chamber 201f when the valve member 202 is shifted toward right under the influence of the pressure prevailing in the chamber 201e.

In this manner, there is produced in the chamber 201f a pressure which is lower than the line pressure. The pressure thus produced is transmitted through the passage 64 to the port 151d of the manual valve 150.

Referring to FIG. 3G, the engine throttle position valve 250 includes a valve body 251 having an axial bore provided with ports 251a, 251b, 251c, 251d, 251e, 251f and 251g. In the axial bore, there are disposed a pair of valve members 252 and 253, a first spring 254 disposed between the valve members 252 and 253, and a second spring 255 which forces the valve member 252 in the direction opposite to the biasing force of the first spring 254. The valve member 252 has a smaller diameter land 252a and a pair of larger diameter lands 252b and 252c. The valve member 253 has a land 253a which is of a diameter equal to those of the lands 252b and 252c of the valve 252.

The valve body 251 is further provided with a pin 256 which serves to limit the leftward movement of the valve member 253. The valve member 253 is connected with the engine throttle valve actuating member through suitable means so that it is moved toward right by a distance corresponding to the engine throttle valve opening. The ports 251d and 251f are connected with the oil reservoir 51.

The port 251a is connected with the port 151b of the manual valve 150, while the ports 251b and 251c are connected together and communicates with a passage 70 which leads to the 1-2 shift valve 700, the 2-3 shift valve 750 and the 3-4 shift valve 800. The passage 70 has a branch passage 70a which leads to the throttle modulator valve 550. The ports 251e and 251g are connected together through a passage 71, and the port 251g is connected with a passage 77 leading to the kick-down control valve 300.

Figure 3H:
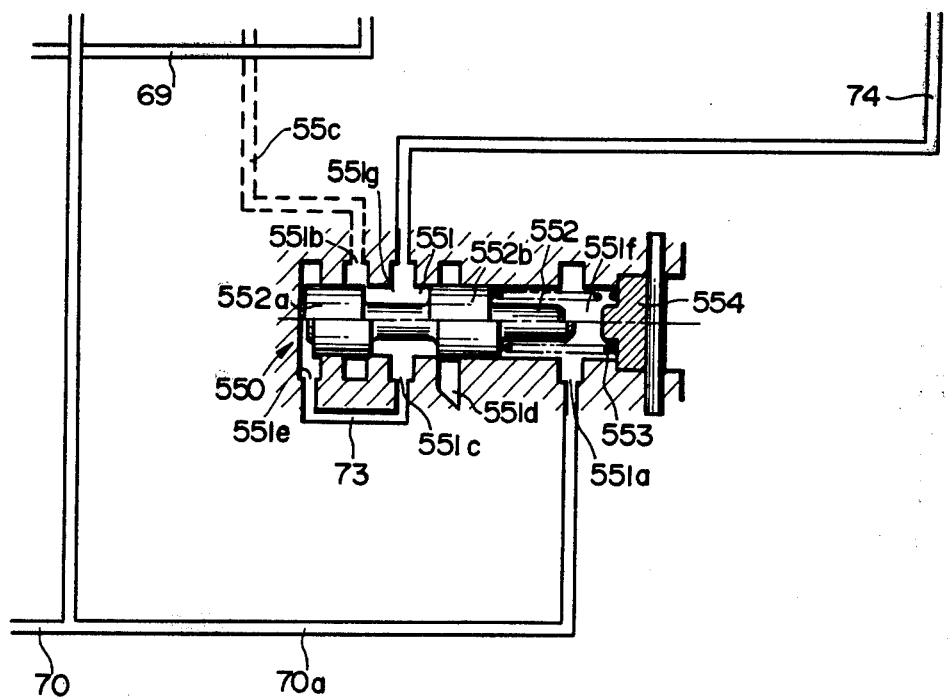

As shown in FIG. 3H, the throttle modulator valve 550 includes a valve body 551 having an axial bore provided with ports 551a, 551b, 551c, 551d and 551e, and a valve member 552 disposed in the axial bore of the valve body 551. The valve member 552 has a pair of axially spaced lands 552a and 552b and biased toward left by means of a spring 553. The right end of the axial bore in the valve body 551 is closed by means of a plug 554 and a pin 555 is provided so as to prevent the plug 554 from being removed from the bore.

The port 551d is a return port and connected with the oil reservoir 51. The ports 551c and 551e are connected together by means of a passage 73. The port 551a is connected through the passage 70a with the port 251b of the engine throttle position valve 250 so as to receive the throttle position pressure which corresponds to the engine throttle valve position. The port 551a is connected with a chamber 551f so that the throttle valve position pressure introduced into the chamber 551f forces the valve member 552 toward right.

Between the lands 552a and 552b, there is defined a chamber 551g which is always in communication with the port 551c. The chamber 551b is also connected with the port 551c when the valve member 552 is moved toward left under the action of the spring 553. The pressure in the chamber 551g is also applied through the port 551c, the passage 73 and the port 551e to the left end of the valve member 552 so as to force it toward right. The port 551b is connected with a passage 55c which is branched from the line pressure passage 55. Thus, it should be noted that in the chamber 551g there is produced a pressure which is determined by the pressures in the chambers 551f and 551g and the spring 553 and which is proportional to but higher than the throttle position pressure.

The pressure thus produced in the chamber 551g is then transmitted through the port 551c to a passage 74 which leads to the fourth brake trimmer valve 950, the third brake trimmer valve 1000, the second brake trimmer valve 1050, the third clutch trimmer valves 1150, the second clutch trimmer valve 1200, and the first clutch trimmer as will be explained later, the port 551b valve 1250, and the passage 55c may be omitted.

As shown in FIG. 3G, the kick-down control valve 300 includes a valve body 301 having an axial bore provided with ports 301a, 301b, 301c and 301d, and a pair of valve members 302 and 303 are disposed in the bore. The valve member 302 has a smaller diameter land 302a, while the valve member 303 has a land 303a which has a diameter slightly larger than that of the land 302a. Between the valve members 302 and 303, there is disposed a spring 304.

The ports 301b and 301c are return ports and connected with a passage 76a which leads to the L-H shift valve 350, while the port 301d is connected with a passage 77 leading to the port 251g of the throttle position valve 250.

Referring further to FIG. 3G, the L-H shift valve 350 includes a valve body 351 having a valve bore provided with ports 351a, 351b and 351c, and a valve member 352 slidably received in the valve bore. The valve member 352 has a pair of axially spaced lands 352a and 352b which are of the same diameter.

The port 351a is connected with the passage 62 from the port 151b of the manual valve 150 to receive a supply of the line pressure through a branch passage 62a. The port 351b is connected with the passage 76a from the port 301a of the kick-down control valve 300, and further connected with a passage 76 leading to the OD shift valve 850.

Referring now to FIG. 3D, the reverse inhibitor valve 900 includes a valve body 901 having a valve bore provided with ports 901a, 901b, 901c, 901d and 901e, and a valve member 902 which has a pair of axially spaced lands 902a and 902b and is slidably received in the valve bore. In the valve bore, a spring 903 is disposed so as to bias the valve member 902 upwardly.

The port 901a is connected with the passage 60 which leads from the port 451d of the governor modulator valve 450, while the oprt 901b is connected with the passage 69 from the port 151i of the manual valve 150. The ports 901c and 901e are connected together and lead to the second brake trimmer valve 1050 and to the servo chamber 45a of the second brake 45. The port 901d is a return port and connected with the oil reservoir 51. The valve member 902 is thus moved under the influence of the governor modulated pressure which is proportional to the governor pressure and of the spring 903.

As shown in FIG. 3D, the L-1 shift valve 650 includes a valve body 651 having a valve bore formed with ports 651a, 651b, 651c, 651d, 651e, 651f, 651g and 651h, and a valve member 652 disposed in the valve bore. The valve member 652 has a large diameter land 652a and three small diameter lands 652b, 652c and 652d, and is biased downwardly by means of a spring 653.

The port 651a is connected with the passage 60 which is from the port 451d of the governor modulator valve 450, while the port 651b is connected with the passage 68 which comes from the port 151h of the manual valve 150. The ports 651c and 651f are return ports leading to the oil reservoir 51. The port 651d is connected with a passage 90 which leads to the third brake trimmer valve 1000 and to the servo chamber 46a of the third brake 46. The port 651h is connected with a passage 91 leading to the 3-4 shift valve 800. The ports 651e and 651g are connected together by means of a passage 92 which also leads to the fourth brake trimmer valve 950 and to the servo chamber 47a of the fourth brake 47.

The 1-2 shift valve 700, which is shown in FIG. 3D, includes a valve body 701 having a valve bore formed with ports 701a, 701b, 701c, 701d, 701e, 701f, 701g, 701h and 701i, and a pair of valve members 702 and 703 disposed in the valve bore. The valve member 702 has a large diameter land 702a, an intermediate diameter land 702b having a diameter slightly smaller than that of the land 702a, a pair of second intermediate diameter lands 702c and 702d having diameters smaller than that of the land 702b, and a smaller diameter land 702e having a diameter smaller than those of the lands 702c and 702d. The valve member 702 is biased upwardly by means of a spring 704. The valve member 703 has a diameter which is smaller than that of the land 702e and is freely received in the valve bore.

The ports 701c and 701g are return ports connected with the oil reservoir 51 and provided with orifices 701j and 701k, respectively. The port 701a is connected with the passage 60 to receive the governor modulated pressure therefrom. The port 701b communicates with the passage 67 which comes from the port 151g of the manual valve 150, while the port 701d is connected with a passage 93 which leads to the second clutch trimmer valve 1200 and to the servo chamber 42a of the second clutch.

The port 701e is connected with a passage 94 which leads to the 2-3 shift valve 750. The port 701f is connected with a passage 95 which leads to the third clutch trimmer valve 1150 and to the servo chamber 43a of the second clutch, and also with a passage 95a which is branched from the passage 95 and leads to the port 101f of the regulator valve 100. The port 701h is connected through the passage 70 with the ports 251b and 251c of the throttle position valve 250 to receive a supply of the throttle position pressure. The port 701i is in communication through the passage 69 with the port 151i of the manual valve 150.

As shown in FIG. 3D, the 2-3 shift valve 750 includes a valve body 751 having a valve bore formed with ports 751a, 751b, 751c, 751d, 751e, 751f, 751g, 751h and 751i, and a valve member 752 slidably received in the valve bore. The valve member 752 has a large diameter land 752a, an intermediate diameter land 752b having a diameter slightly smaller than that of the land 752a, two small diameter lands 752c and 752d, a further small diameter land 752e having a diameter smaller that of the land 752c and a small diameter land 752f having a diameter smaller than that of the land 752e. The valve member 752 is biased upwardly as seen in the drawing by means of a spring 753 which acts between the valve member 752 and a spring retainer 754 provided in the valve body 751.

The ports 751c and 751i are return ports which are connected with the oil reservoir 51, and the port 751c is provided with an orifice 751k. The port 751a is connected with the governor pressure line 59 which is in turn connected with the port 401b of the governor valve 400, and the port 751b with the passage 66 which is from the port 151f of the manual valve 150. The port 751d is connected with a passage 97 which leads to the first clutch trimmer valve 1250 and to the servo chamber 41a of the clutch 41 as well as to the servo chamber 18a of the direct drive clutch 18. The port 751e is connected with a passage 98 leading to the shift valve 500, and the port 751f with the passage 94 which is from the port 701e of the 1-2 shift valve 700. The port 751g is connected through a passage 98 with the OD shift valve 850, while the port 751h is connected through the port 701h of the 1-2 shift valve 700 and the passage 70 with the ports 251b and 251c of the throttle position valve 250.

Referring now to FIG. 3c, the 3-4 shift valve 800 includes a valve body 801 having a valve bore formed with ports 801a, 801b, 801c, 801d, 801e, 801f, 801g, 801h, 801i, 801j, 801k and 801l. In the valve bore, there are disposed a first valve member 802 and a second valve member 803. The first valve member 802 is provided with a large diameter land 802a, a medium diameter land 802b having a diameter slightly smaller than that of the land 802a, two second medium diameter lands 802c and 802d having diameters smaller than the land 802b and a smaller diameter land 802e having a diameter smaller than those of the lands 802c and 802d. The second valve member 803 has a land 803a of which diameter is smaller than that of the small diameter land 802e. Between the first and second valve members 802 and 803, there is disposed a spring 804 which acts between the valve members. A second spring 805 is provided in the valve bore to force the first valve member 803 in the upward direction. A spring retainer 806 is provided on the first valve member 802 so as to receive the springs 804 and 805.

The port 801a is connected with the passage 59 which leads to the port 401b of the governor valve 400, and the port 801b is connected with the passage 65 which leads to the port 151e of the manual valve 150 and which has a branch passage 65b leading to the OD shift valve 850. The ports 801d, 801h and 801j are return ports which are connected with the oil reservoir 51. The ports 801d and 801h are provided with orifices 801m and 801n, respectively. The port 801e is connected with a passage 99 which is also leading to the OD shift valve 850.

The port 801f is connected with a passage 61 which leads to the shift valve 500 as well as with the port 151 of the manual valve 150. The port 801g is connected with the passage 91 which is in turn connected with the port 651h of the L-1 shift valve 650. The port 801i is connected through a passage 81 with the port 801k. The port 801l is connected through the port 751h of the 2-3 shift valve 750 and the port 701b of the 1-2 shift valve 700 and through the passage 70 with the ports 251b and 251c of the throttle position valve 251.

The OD shift valve 850 shown in FIG. 3c includes a valve body 851 having a valve bore formed with ports 851a, 851b, 851c, 851d, 851e, 851f, 851g and 851h, and a valve member 852 slidably disposed in the valve bore. The valve member 852 has a large diameter land 852a, two medium diameter lands 852b and 852c having diameters slightly smaller than that of the land 852a, and a small diameter land 852d having a diameter smaller than that of the lands 852b and 852c. The valve member 852 is biased upwardly as seen in the drawing by means of a spring 853 which acts between the valve member 852 and a spring retainer 854 provided on the valve body 851.

The port 851a is connected through the governor pressure passage 59 with the port 401b of the governor valve 400. The ports 851b and 851f are return ports which are connected with the oil reservoir 51. These ports 851b and 851f are provided with orifices 851i and 851j, respectively. The port 851c is connected with a passage 861 which leads to the first brake trimmer valve 1100 and to the servo chamber 44a of the first brake 44. The port 851d is connected with the passage 99 which is in turn connected with the port 801e of the 3-4 shift valve 800, and the port 851e with the passage 98 which is in turn connected with the port 751g of the 2-3 shift valve 750. The port 851g is connected through the passage 65b with the port 801b of the 3-4 shift valve 800 which is in turn connected through the passage 65 with the port 151e of the manual valve 150. The port 851h is connected through the passage 76 with the port 351b of the L-H shift valve 350 and with the port 301a of the kick-down control valve 300.

The shift valve 500 shown in FIG. 3F includes a valve body 501 having a valve bore formed with valve ports 501a, 501b and 501c, and a valve member 502 slidably received in the valve bore. The valve member 502 is biased by means of a spring 503 which acts between the valve member 502 and a plug 504 fitted in the valve bore and maintained in position by means of a pin 506. A seal ring 505 is disposed around the plug 504 for the purpose of maintaining fluid tightness.

The port 501a is connected with the passage 61 with the port 151b of the manual valve 150 and with the port 801f of the 3-4 shift valve 800. The port 501b is connected with the port 751e of the 2-3 shift valve 750, and the port 501c through the passage 69 with the port 151i of the manual valve 150.

Referring to FIG. 3c, the torque converter pressure control valve 600 includes a valve body 601 having a valve bore formed with valve ports 601a and 601b, and a valve member 602 slidably received in the valve bore. The valve member 602 is biased toward left by means of a spring 603 which acts between the valve member 602 and a pin 604 provided in the valve body 601 for the purpose. The ports 601a receives hydraulic oil from the torque converter through an oil cooler 1300 and provides a supply of lubricating oil to various frictional parts in the transmission.

Referring now to FIG. 3B, the fourth brake trimmer valve 950 includes a valve body 951 having a valve bore formed with valve ports 951a, 951b, 951c, 951d and 951e, and a pair of axially aligned valve members 952 and 953. The valve member 952 is positioned at the lower portion of the valve bore as seen in the drawing, and the valve member 953 is positioned at the upper portion thereof. Between the valve members 952 and 953, there is disposed a spring 954.

The ports 951d and 951e are both connected with a chamber 951f defined in the valve bore by means of the upper end of the valve member 953, and a one-way check valve 955 is provided between the port 951e and the chamber 951f in such a manner that fluid flow is permitted from the chamber 951f to the port 951e but blocked in the opposite direction. The port 951a is connected through the passage 92 with the ports 651e and 651g of the L-1 shift valve 650 and further with the ports 951d and 951e and the servs chamber 47a of the fourth brake 47. The port 951b is connected with the passage 74 which leads to the port 551c of the throttle position modulator valve 550. The port 951c is a return port connected with the oil reservoir 51.

The trimmer valves 1000, 1050, 1100, 1150, 1200 and 1250 have the same construction as the trimmer valve 950 does so that their detailed structures will not be specifically described but only the mutual connections will hereinafter be described.

As shown in FIG. 3B, the third brake trimmer valve 1000 has a port 1001a which is connected with the port 651d of the L-1 shift valve 650 and also with the ports 1001d and 1001e as well as the servo chamber 46a of the third brake 46. The port 1001b of the valve 1000 is connected through the passage 74 with the port 551c of the throttle position modulator valve 550. The port 1001c is return line which opens to the oil reservoir 51. There is also provided a one-way check valve 1005 which functions the same as the one-way valve 955.

The second brake trimmer valve 1050 shown in FIG. 3B has a port 1051a connected with the ports 901c and 901e of the reverse inhibitor valve 900 and also with the ports 1051d and 1051e as well as the servo chamber 45a of the second brake 45. The port 1051b is connected through the passage 74 with the port 551c of the throttle modulator valve 550. The port 1051c is a return port which opens to the oil reservoir 51. There is also provided a one-way check valve 1055 which functions as the one-way valve 955 does.

The first brake trimmer 1100 shown in FIG. 3B has a port 1101a which is connected with the port 801g of the 3-4 shift valve 800 and also with the ports 1101d and 1101e as well as the servo chamber 44a of the first brake 44. The port 1101b is connected through the passage 74 with the port 551c of the throttle position modulator valve 550. The port 1101c is a return port which opens to the oil reservoir 51. There is also provided a one-way check valve 1105 which functions as the one-way valve 955 does.

Referring now to FIG. 3A, the third clutch trimmer valve 1150 has a port 1151a which is connected with the port 701f of the 1-2 shift valve 700 and also with the port 101f of the regulator valve 100 as well as the ports 1151d and 1151e and the servo chamber 43a of the third clutch 43. The port 1151b is connected through the passage 74 with the port 551c of the throttle position modulator valve 550. The port 1151c is a return port which is connected with the oil reservoir 51. There is also provided a one-way check valve 1155 which functions as the one-way valve 955 does.

The second clutch trimmer valve 1200 shown in FIG. 3A has a port 1201a which is connected with the port 701d of the 1-2 shift valve 700 and with the ports 1201d and 1201e as well as the servo chamber 42a of the second clutch 42. The port 1201b is connected with the passage 74 which is in turn connected with the port 551c of the throttle modulator valve 550. The port 1201c is a return port which opens to the oil reservoir 51. There is also provided a one-way check valve 1205 which functions as the one-way valve 955 does.

The first clutch trimmer valve 1250 has a port 1251a which is connected with the port 751d of the 2-3 shift valve 750 and with the ports 1251d and 1251e as well as the servo chamber 41a of the first clutch 41 and the servo chamber 18a of the direct drive clutch 18. The port 1251b is connected with the passage 74 which is in turn connected with the port 551c of the throttle position modulator valve 550. The port 1251c is a return port connected with the oil reservoir 51. There is also provided a one-way check valve 1255 which functions as the one-way valve 955 does.

The operation of the transmission will now be described. As soon as the engine is started, the pump 50 is driven thereby so that the hydraulic oil is drawn from the reservoir 51 through the strainer 52 and the passage 53 into the pump 50 and discharged into the outlet passage 54. The pressure thus produced in the passage 54 is supplied to the chambers 101i and 101g of the regulator valve 100 to act on the land 102a so that the valve member 102 is shifted upwardly against the influence of the spring 103.

The opward movement of the valve 102 causes a communication between the chamber 101i with the return port 101b resulting in a decrease in the pressure in the chamber 101i. Such decrease in pressure in the chamber 101i causes a corresponding decrease in the pressure in the chamber 101g so that the valve member 102 is moved back under the force of the spring 103 so that the communication between the chamber 101i and the return port 101b is interrupted. In this manner, the regulator valve 100 provides a substantially constant pressure which is on one hand determined by the force of the spring 103.

The line pressure thus produced is also introduced through the passage 95a into the chamber 101l to assist the spring 103 when the transmission is operated in either of the LOW, ist or REVERSE position so as to provide a higher line pressure which will be required for resisting higher to torque reaction forces that may be encountered in either of the operating conditions.

The port 101d of the regulator valve 100 has the orifice 108 as previously described and the port 101d is connected with the torque converter 10 through this orifice and the passage 57. By properly determining the orifice 108, it is possible to determine the hydraulic pressure supplied to the torque converter 10. The hydraulic oil which has passed through the torque converter is passed through the oil cooler 1300 to be cooled therein and further through the torque converter pressure control valve 600 by which the pressure at the outlet side of the torque converter 10 is appropriately determined.

The hydraulic pressure from the regulator valve 100 is passed into the passage 55 from which it is further passed through the branch passage 55a to the inlet port 401a of the governor valve 400. In the governor valve 400, the inlet port 401a is blocked by the land 402a of the valve member 402 when the automobile is not running and therefore the output shaft 19 is stationary. Thus, no outlet pressure is produced under this condition in the governor valve 400.

Figure 4:
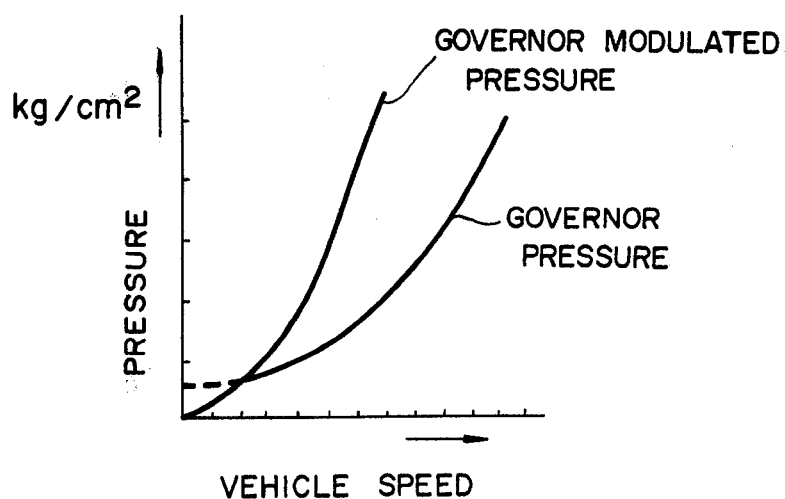
FIG. 4 is a diagram showing the changes of the governor modulated pressure and the governor pressure in accordance with the vehicle speed.

As the vehicle is started and the output shaft 19 of the transmission 20 starts to rotate, the centrifugal force on the valve member 402 of the governor valve 400 shifts the valve member 402 radially outwardly to open the port 401a to the port 401b so that there is produced in the port 401b a governor pressure which acts on the lands 402a and 402b and produces a radially inward force due to the difference in area between these two lands. As the consequence, the governor pressure increases in accordance with an increase in the vehicle speed as shown in FIG. 4. The governor pressure thus produced is transmitted through the passage 59 to the 2-3 shift valve 750, the 3-4 shift valve 800, and the OD shift valve 850 to control the valves in accordance with the vehicle speed. Further, the governor pressure is also supplied to the inlet port 451 of the governor modulator valve 450.

The governor modulator valve 450 is supplied with the governor pressure at the right side of the piston 452 as shown in FIG. 3F and also with a line pressure at the port 451e from the passage 55 through the branch passage 55b. When the valve member 453 is shifted toward left, the port 451e is connected with the port 451d so that the line pressure is transmitted from the port 451d to the port 451f to act on the left and of the valve member 453.

Since the piston 452 has a larger area than the land 453b on the valve member 453, there is produced at the outlet port 451d of the governor modulator valve 450 a governor modulated pressure which is higher than the governor pressure as shown in FIG. 4. The governor modulated pressure is supplied to the reverse inhibitor valve 900, the L-1 shift valve 650, and the 1-2 shift valve 700 as shown in FIG. 3D to control these valves in accordance with the vehicle speed.

When the manual valve 150 is in the forward position, the line pressure is supplied from the passage 55 through the ports 151a and 151b of the manual valve 150 and through the passage 62 to the inlet port 251a of the throttle position valve 250. The springs 254 and 255 of the valve 250 are so adjusted that, when the engine throttle valve is closed and the valve member 253 is therefore at the extreme left position when it abuts the pin 256, the land 252b of the valve member 252 blocks the inlet port 251a so that the throttle position pressure is not produced until the engine throttle valve is opened and the valve member 253 is shifted toward right to compress the spring 254.

As the engine throttle valve is opened and the valve 253 is shifted toward right beyond a certain distance, the force of the spring 254 overcomes the spring 255 so that the valve member 252 is shifted toward right to open the inlet port 251a. The pressurized fluid introduced through the inlet port 251a is passed through the port 251b, the passage 70 and the port 251c to act on the lands 252a and 252b so that the valve member 252 is forced toward left against the action of the spring 254 due to the difference in area between the lands 252a and 252b. The leftward movement of the valve member 252 closes the inlet port 251a and connects the port 251b with the ports 251e and 251g. In this instance, the port 251e is connected through the passage 71 and the port 251g with the return port 251f.

As soon as the port 251e is opened to the port 251f, the pressure in the passage 70 decreases and the valve member 252 is forced back toward right under the force of the spring 254 to interrupt the communication between the ports 251e and 251f and establish the communication between the ports 251a and 251b. Thus, the throttle position valve 250 establishes a throttle position pressure which increases in response to the opening of the engine throttle valve. The throttle position pressure thus produced is transmitted to the passage 70.

When the engine throttle valve actuating member is further moved to or near the full stroke position, the valve member 253 is moved to the position where the port 251g is blocked and the communication between the ports 251g and 251f is interrupted. The pressure in the port 251g is transmitted through the passage 77 to the inlet port 301d of the kick-down control valve 300 to act on the left end of the valve member 302 to open the port 301d to the return port 301c. Thus, the valve 300 provides a back-up pressure to the port 251g, said back-up pressure being determined on one hand by the force of the spring 302 and on the other hand by the line pressure introduced into the inlet port 301a. When the line pressure does not exist in the port 301a, the pressure in the port 251g will be maintained at a valve lower than the line pressure, however, when the line pressure is introduced into the port 301a, the pressure in the port 251g will be at the same level as the line pressure. In any event, when the port 251g is blocked from communication with the port 251f, the pressure at the port 251b no longer depends on the engine throttle valve position but will be at the same valve as the pressure in the port 251g. Thus, there will be an abrupt increase in the pressure in the line 70.

As seen in FIG. 3H, the throttle position pressure modulating valve 550 is supplied at the inlet port 551a with the throttle position pressure through the passage 70a. The pressure co-operates with the spring 553 to shift the valve member 552 toward left. Thus, the valve member 552 is in a position where the communication between the chamber 551g and the return port 551d is interrupted and the port 551b is opened to the chamber 551g. Thus, the pressurized fluid is introduced from the passage 55c into the chamber 551g and the pressure in the chamber 551g is transmitted through the passage 73 to the port 551e to act on the valve member 552 to force it toward right. In this manner, there is produced in the chamber 551g a throttle position modulated pressure which is higher than but corresponding to the throttle position pressure. In an arrangement wherein the port 551b is omitted, hydraulic pressure is transmitted through the passage 74 and the port 551c into the chamber 551g and adjusted in the above described manner to produce the throttle position modulated pressure. Therefore, it should be noted that the throttle position modulated pressure prevails in the passage 74 which leads to the ports 951b, 1001b, 1051b, 1101b, 1151b, 1201b and 1251b in the trimmer valves.

Since the operations of the trimmer valves are the same, only the fourth brake trimmer valve 950 will hereinafter be described.

Referring to FIG. 3B, the port 951b is supplied with the aforementioned throttle position modulated pressure from the passage 74. Under this situation, the passage 92 is supplied with the line pressure when the fourth brake is to be actuated. Then, the line pressure is introduced into the port 951a to act on the bottom end of the valve member 952 whereby the valve member 952 is forced upwardly against the action of the spring 954 to open the port 951a to the port 951b.

Figure 10:
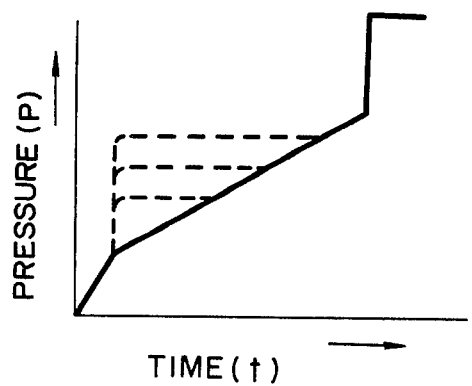

At the same time, the pressure in the line 92 is also introduced through the port 951d into the chamber 951f to force the valve member 953 downwardly so as to increase the compression of the spring 954. The pressure at the port 951a and therefore at the port 951d is at first maintained at the valve of the throttle position modulated pressure at the port 951b and then gradually increased to the line pressure as shown in FIG. 10.

In an arrangement where the port 551b is omitted, the pressure in the passage 74 may be released at the beginning of the operation. However, as soon as the line pressure is supplied through the line 92 to the port 951a and the valve member 952 is shifted upwardly to open the port 951a to the port 951b, the throttle position modulated pressure is established in the passage 74.

When the brake pressure in the line 92 is released, the valve members 952 and 953 are returned to the initial positions. In this instance, the hydraulic fluid which has been in the chamber 951f is instantaneously exhausted through the port 951d and also through the port 951e having the one-way check valve 955. It will therefore be noted that, although the pressure increase in the servo chamber 47a is very gentle to provide a smooth engagement of the brake, the pressure can be instantaneously be released.

When the L-H shift valve 350 is manually shifted to H position, the land 352b of the valve members 352 blocks the inlet port 351a which is in communication with the passage 62a branched from the passage 60. The port 351b which is in communication with the passage 76 is connected with the return port 351c. When the valve 350 is in L-position, the inlet port 351a is connected with the port 351b so that it is communicated through the passage 76 with the port 851h of the OD shift valve 850. Thus, pressure is applied to the land 852d of the valve member 852 to force the valve member 852 upwardly so as to inhibit the operation of the OD shift valve. Pressure is further supplied through the passage 76a to the port 301a of the kick-down control valve 300 to act on the right end of the land 303a of the valve member 303 to force the valve member 303 toward left so as to increase the kick-down pressure which determines the point of start of the kick-down operation.

The control in the automatic transmission will further be described with respect to various positions of the manually operated valve 150.

NEUTRAL POSITION

When the selector lever (not shown) is shifted to position the manual valve 150 at the neutral position, the line pressure supplied from the line passage 55 to the inlet port 151a of the manual valve 150 is blocked by the lands 152a and 152b of the valve member 152 so that the pressurized fluid is not transmitted to any other valves and the friction devices. Therefore, the transmission is maintained at the neutral position. Although the pressure is supplied from the passage 55 to the governor valve 400, no governor pressure is produced since the vehicle is stationary.

L-RANGE

When the manual valve 150 is moved to the L-position, the line pressure is supplied from the passage 55 through the space between the lands 152a and 152b of the valve 150 to the passages 61, 62 and 63. The line pressure in the passage 61 is supplied to the port 801f of the 3-4 shift valve 800. The pressure in the passage 62 is supplied to the port 251a and the pressure in the passage 63 is supplied to the downshift control valve 200 to produce a downshift control pressure which is of a substantially constant valve lower than the line pressure. The downshift control pressure is transmitted through the passage 64 to the port 151d of the manual valve 150 and then through a space between the lands 152b and 152c to the passages 65, 66, 67 and 68.

The pressure in the passage 65 is transmitted to the port 801b of the 3-4 shift valve 800 to be applied to the lands 802a and 802b of the valve members 802 to move the valve member upwardly and lock at the downshift position. Thus, the line pressure at the port 801f of the 3-4 shift valve 800 is passed through the space between the lands 802d and 802e of the valve member 802 to the port 801g. The port 801g is connected through the passage 91 with the port 651h of the L-1 shift valve 650 and, since the downshift pressure at the passage 68 acts on the large diameter land 652a and the small diameter land 652b of the valve member 652 and lock the same at the low speed position, the pressure is also supplied through the space between the lands 652c and 652d of the valve member 652, the port 651e and the passage 92 to the fourth brake trimmer valve 950.

The line pressure thus supplied to the fourth brake trimmer valve 950 is controlled by the valve as previously described and applied to the servo chamber 47a of the fourth brake 47 to cause the engagement of the same.

The line pressure from the passage 61 is applied to the port 501a of the shift valve 500 so as to shift the valve member 502 toward right to open the port 501a to the port 501b whereby the pressure is further applied through the passage 98 to the port 751e of the 2-3 shift valve 750.

In this instance, since the valve member 752 is maintained at the upwardly moved position or the downshift position under the influence of the downshift pressure which has been introduced through the passage 66 and the port 751b of the 2-3 shift valve 750 into the space between the large diameter land 752a and the small diameter land 752b, the line pressure at the port 751e is transmitted through the space between the lands 752d and 752e of the valve member 752 to the port 751f which is in communication through the passage 94 with the port 701a of the 1-2 shift valve 700.

The valve member 702 is in this instance maintained in the downshift position under the influence of the downshift pressure which has been supplied from the passage 67 to the space between the large diameter land 702a and the small diameter land 702b on the valve member 702, so that the line pressure at the port 751f is transmitted through the space between the lands 702d and 702e of the valve member 702, the port 701f and the passag 95 to the third clutch trimmer valve 1150. The line pressure thus supplied to the third clutch trimmer valve 1150 is adjusted as in the case of the line pressure supplied to the trimmer valve 950, and then transmitted to the servo chamber 43a of the third clutch 43 to effect the engagement of the same. Thus, the third clutch functions, in co-operation with the fourth brake which is also in engagement, to provide the forward lowest speed drive stage or the LOW range.

The pressure as controlled by the third clutch trimmer valve 1150 is also transmitted through the passage 95a to the chamber 101l of the pressure regulator valve 100 to cause a gradual increase of the line pressure to the high pressure level. Thus, the line pressure can be increased to a level sufficient for the engagement of the third clutch 43 with a sufficiently slower rate of increase for providing a smooth engagement.

The passages 65, 66, 67 and 68 are supplied with a pressure which has been controlled by the downshift control valve 200 at a constant value suitably lower than the line pressure. Further, the valve members of the shift valves 650, 700, 750 and 800 are appropriately designed to have lands of suitable area for receiving such controlled pressure, so that an actuation of the manual valve 150 to the L-position under a high speed operation does not immediately cause a shiftdown of the gear device until the governor pressure is decreased to a certain value since the governor pressure otherwise overcomes such controlled pressure. This is important in preventing operation of the engine beyond an allowable speed.

Figure 9:
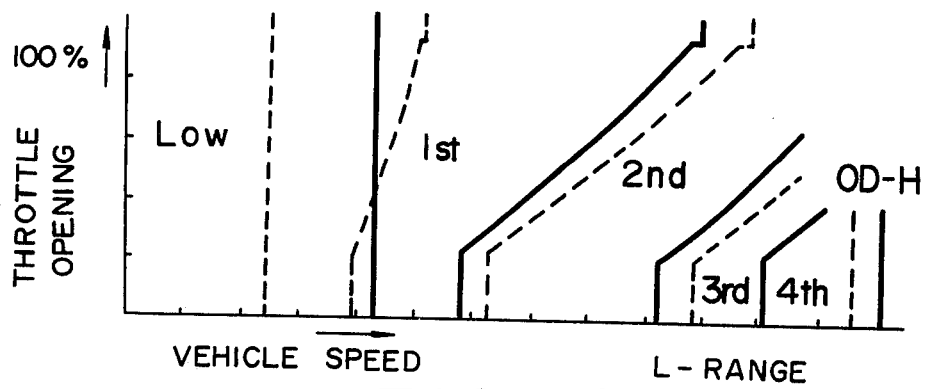
FIG. 9 is a diagram similar to FIGS. 5 through 8 but showing the operation under L-range; and, FIG. 10 is a diagram showing the change in the actuator operating pressure.

Once the lowest speed forward drive stage is established with the manual valve 150 positioned in the L-position, the vehicle speed cannot be increased to a sufficient value wherein the gear shift-up can take place. This function is shown in FIG. 9.

1st-RANGE

With the manual valve 150 in the 1st position, the supply of the line pressure is the same as in the L-pange but the downshift pressure is supplied only to the passages 65, 66 and 67 but not to the passage 68. Therefore, the valve members of the 1-2 shift valve 700, the 2-3 shift valve 750 and the 3-4 shift valve 800 are all maintained at the shiftdown position, and the line pressure in the passage 61 is supplied to the port 651$h$ of the L-1 shift valve 650.

In this instance, the valve member 652 of the L-1 shift valve 650 is maintained in the shift-up position under the influence of the spring 653, so that the port 651$h$ is in communication through the space between the lands 652$b$ and 652$c$ with the port 651$d$. Therefore, the line pressure in the port 651$h$ is transmitted through the passage 90 to the third brake trimmer valve 1000. Thus, the third brake is smoothly brought into engagement under the function of the trimmer valve 1000.

Figure 8:
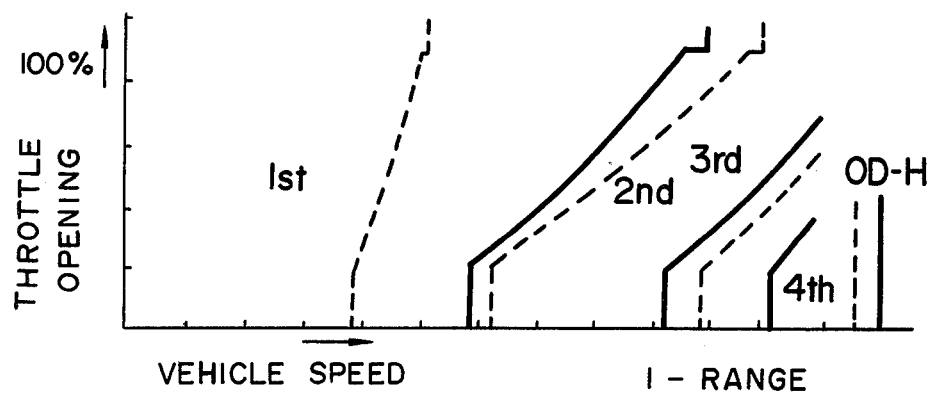
FIG. 8 is a diagram similar to FIGS. 5 through 7 but showing the operation under 1-range.

As in the L-range, when the manual valve 150 is moved to the 1st-position under a high speed vehicle operation, the gear shift down to the 1st stage does not immediately take place until the governor pressure is decreased. Once the shift-down to the first stage is established in this position of the manual valve 150, the vehicle speed cannot be increased to a value sufficient to effect a gear shift-up. The function is shown in FIG. 8.

2nd-RANGE

When the manual valve 150 is moved to the 2nd position, the supply of the down-shift pressure to the passage 67 is cut-off. Since the pressure in the space between the lands 702$a$ and 702$b$ is relieved, the 1-2 shift valve 700 functions just like a normal shift valve does. Thus, the valve member 702 is moved under the influence of the governor modulated pressure on the land 702$a$ and the engine throttle position pressure on the land 702$e$ to provide an automatic switching between the 1st and the 2nd gear stages.

Figure 7:
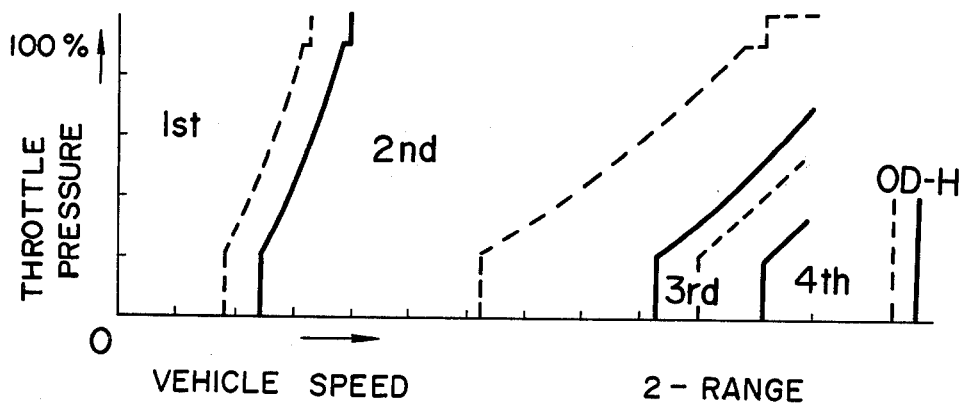
FIG. 7 is a diagram similar to FIGS. 5 and 6 but showing the operation under 2-range.

In this instance, the valve member of the L-1 shift valve 650 is maintained at the shift-up position under the influence of the spring 653 and the governor modulated pressure acting on the large diameter land 652$a$. Therefore, the gear device is not shifted down to the LOW position. This function is shown in FIG. 7.

When the gear device is shifted up to the 2nd stage, the pressure is no longer supplied to the chamber 101 of the regulator valve 100, so that the line pressure is maintained at a lower level. In other words, the pressure for engagement of for example, the third brake 46 is lower than the same pressure when the 1st gear stage is provided. The lower level line pressure is adequate for providing the engagements of the friction devices for the OD, the 4th, the 3rd and the 2nd gear stages where the speed reduction ratios are relatively low.

Figure 6:
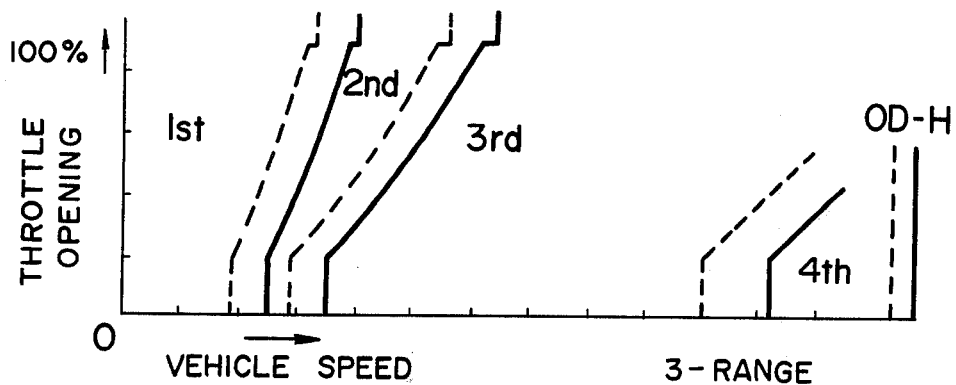
FIG. 6 is a diagram similar to FIG. 5 but showing the operation under 3-range.

3rd-RANGE

Where the valve member of the manual valve 150 is in the 3rd-position, the supply of the downshift pressure to the passage 66 is further cut-off as compared with the situation in the 2nd-position. Therefore, the pressure in the space between the lands 752$a$ and 752$b$ on the valve m member 752 of the 2-3 shift valve 750 is relieved. Thus, the 2-3 shift valve 750 and the 1-2 shift valve 700 are operated under the influence of the governor pressure or the governor modulated pressure and the throttle position pressure so as to provide an automatic switching between the 1st, the 2nd and the 3rd gear stages. In this instance too, the gear device is not shifted down to the LOW stage as in the case of the 2nd-range. Further, the line pressure is at a lower level when the gear device is in the 2nd and the 3rd stages, while it is at a higher level in the 1st stage. The function is shown in FIG. 6.

D-RANGE

Wher the valve member of the manually controlled valve 150 is in the D-position, the line pressure which has been supplied to the passage 65 is cut-off as compared with the situation where the valve 150 is in the 3rd-range. Thus, the pressure is relieved from the space between the lands 802$a$ and 802$b$ of the valve member 802 in the 3-4 shift valve 800. Therefore, the shift valves other than the L-1 shift valve 650, namely, the 1-2 shift valve 700, the 2-3 shift valve 750, the 3-4 shift valve 800 and the OD shift valve 850 are operated under the influence of the governor pressure or the governor modulated pressure and the throttle position pressure to provide an automatic switching among the 1st, the 2nd, the 3rd, the 4th and the over-drive stages of the gear device.

With the L-H shift valve 350 is in the high speed position, that is, the H-position, the line pressure which has been supplied from the manual valve 150 through the passages 62 and 62$a$ to the port 351$a$ of the L-H shift valve 350 is blocked by the land 352$b$ of the valve member 352, so that the line pressure is not supplied to the port 351$b$. Therefore, the port 851$h$ of the OD shift valve 850 is not supplied with the line pressure and the valve member 852 of the OD shift valve 850 is moved downwardly to the high speed position under the force of the governor pressure which is introduced through the passage 59 to the port 851$a$. Thus, it becomes possible to shift the gear device to the over-drive stage as shown by the line OD-H in FIG. 5.

With the L-H shift valve 350 in the low speed position, that is, the L-position, the port 351$a$ of the valve 350 is connected through the space between the lands 352$a$ and 352$b$ of the valve member 352 with the port 351$b$, whereby the line pressure is supplied through the passage 76 to the port 851$h$ of the OD shift valve 850 to shift the valve member 852 upwardly to the low speed position. Thus, it becomes possible to provide the over-drive stage as shown by the OD-L line in FIG. 5.

Under this position of the L-H shift valve 350, the line pressure is supplied to the port 851$h$ of the OD shift valve 850, so that the shift-up to the over-drive stage is established at the vehicle speed higher than the speed at which it took place when the L-H shift valve 350 is in the H-position. Once the vehicle speed is lowered so that the gear device is shifted down to the 4th or lower gear stages, the vehicle speed can no longer be increased to a value sufficient for the shift-up to the overdrive stage.

Figure 5:
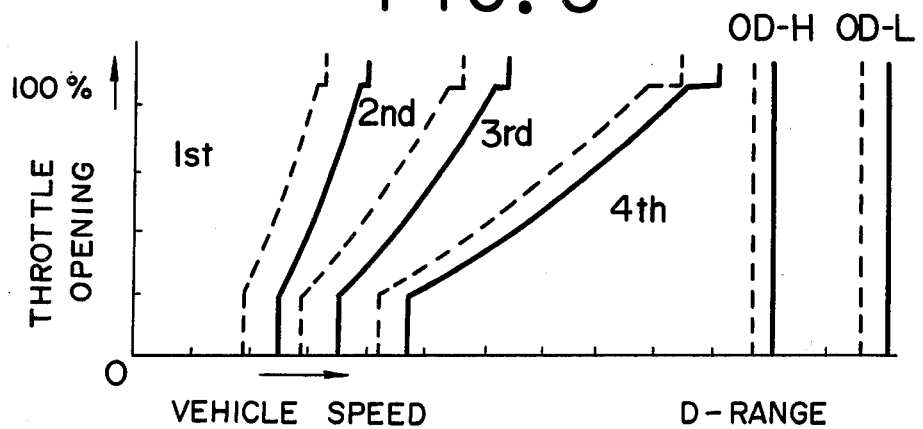
FIG. 5 is a diagram showing the operation of the transmission gear mechanism under D-range.

In the D-range, the gear device is not shifted down to the LOW stage as in the 3rd-range. Further, the line pressure is at the lower level under the 2nd, the 3rd, the fourth and the OD gear stages while it is at the higher level under the 1st gear stage. The function is shown in FIG. 5. It is preferable to vary the level of the line pressure for each of the gear stages and for the purpose the regulator valve 100 may include, in addition to the chamber 101*l*, further chambers defined by a valve member having stepped lands.

R-RANGE

When the manual valve 110 is moved to the R-position, the line pressure passage 55 is connected through the port 151*a*, the space between the lands 152*a* and 152*b* of the valve member 152 and the port 151*i* with the passage 69. From the passage 69, the line pressure is supplied to the port 901*b* of the reverse inhibitor valve 900 and the port 701*i* of the 1-2 shift valve 700. The line pressure is further transmitted through the port 501*c* of the shift valve 500, and the port 501*b* to the passage 98 from where it is further supplied to the port 751*e* of the 2-3 shift valve 750.

The spring 903 of the reverse inhibitor valve 900 is relatively weak so that, if the manual valve 150 is shifted to the R-position when the vehicle is running forward, the governor modulated pressure at the port 901*a* of the valve 900 overcomes the force of the spring 903 as far as the vehicle speed is greater than 20 Km/h. Thus, the valve member 902 is shifted downwardly to the position where the land 902*a* blocks the port 901*b*. Thus, the gear device is not shifted to the reverse drive stage but maintained at the neutral position.

When the vehicle forward speed is less than the aforementioned value, the valve member 902 is moved under the force of the spring 903 upwardly to the position where the port 901*b* is connected through the space between the lands 902*a* and 902*b* of the valve member 902 with the port 901*c*. Thus, the line pressure is supplied to the passage 80.

The line pressure at the passage 80 is transmitted through the port 901*e* of the reverse inhibitor valve 900 to shift the valve member 902 upwardly in such a manner that the gear device is not shifted to the neutral position when the vehicle speed exceeds the aforementioned speed for example 20 Km/h in the vehicle reverse drive.

The line pressure at the passage 80 is further supplied through the second brake trimmer valve 1050 to the servo chamber 45*a* of the second brake 45 so as to effect smooth engagement of the second brake 45.

Since the valve members of the 2-3 shift valve 750 and the 1-2 shift valve 700 are all shifted to the upward positions under the influence of the spring 753 and 704, respectively, the line pressure at the port 751*e* of the valve 750 is transmitted through the space between the lands 752*d* and 752*e* of the valve member 752, the port 751*f* to the passage 94 and then through the port 701*e* of the valve 700, the space between the lands 702*d* and 702*e* and the port 701*f* to the passage 95.

The pressure in the passage 95 is transmitted through the third clutch trimmer valve 1150 to the servo chamber 43*a* of the third clutch 43 so that the third clutch 45 is smoothly engaged. Thus, with the manual valve 150 in the R-position, the third clutch 45 and the second brake 45 are actuated to provide the reverse drive gear stage. In the reverse drive, the pressure as controlled by the third clutch trimmer valve 1150 is introduced through the passage 95*a* to the chamber 101*f* of the regulator valve 100 so as to gradually increase the line pressure. The increased line pressure is at a level adequate to actuate the third clutch 45 for the reverse drive.

From the above descriptions, it will be noted that the objects of the present invention can be accomplished by the control circuit means described above. Since the trimmer valve is supplied at the return port with a pressure corresponding to the engine load, the initial pressure applied to the actuator is determined in accordance with the engine load. Further, since the pressure representing the engine load is applied to the return port, any movement of the valve member does not have any influence on the pressure whereby no adverse effect is given to other valves which utilizes the same pressure.

The invention has thus been shown and described with refernce to a specific embodiment, however, it should be noted that the invention is in no way limited to the details of the illustrated arrangements but changes and modifications may be made without departing from the scope of the appended claims.

I claim:

1. Automatic transmission for automobiles which comprises gear means having at least one frictional constraining means adapted for selective operation to provide a plurality of different speed ratios, actuator means associated with said constraining means, control circuit means including at least one hydraulic pressure line for the actuator means to provide a supply of operating pressure to said actuator means, said control circuit means further including at least one return line, trimmer valve means disposed between said hydraulic pressure line and said return line and including at least one valve member biased toward a first position wherein the hydraulic pressure line is blocked from communication with the return line, means for applying hydraulic pressure in the pressure line to the valve member so that the valve member is urged under the pressure toward a second position wherein the hydraulic pressure line is opened to the return line whereby the pressure in the hydraulic pressure line is allowed to leak into the return line to produce a modified pressure in the hydraulic pressure line, means for applying the modified pressure to the valve member so that the valve member is urged by the modified pressure toward the first position, and means for establishing in the return line a pressure corresponding to engine load.

2. Automatic transmission in accordance with claim 1 in which said trimmer valve means includes axially aligned first and second valve members disposed in a valve bore, a spring disposed between the first and the second valve members return port means connected with said return line and co-operating with said first valve member, said hydraulic pressure line being connected so that the pressure is supplied to the side of the first valve member opposite to said spring whereby the first valve member is displaced under the pressure to open the hydraulic pressure line to the return line, said hydraulic pressure line being further connected to apply pressure to the side of the second valve member.

3. Automatic transmission in accordance with claim 2 in which said hydraulic pressure line is communicated to said side of the first valve member through a first port, and to said side of the second valve member through a second port which is provided between said first port and said actuator means.

4. Automatic transmission in accordance with claim 2 in which said second valve member has a pressure receiving area which is larger than that of the first valve member.

5. Automatic transmission in accordance with claim 3 in which said trimmer valve means is further provided between the hydraulic pressure line and the second port with a first passage and a second passage which is disposed in parallel with the first passage and has one-way check valve means that allows fluid flow only toward the hydraulic pressure line.

6. Automatic transmission in accordance with claim 1 in which the last mentioned means is valve means which establishes a pressure corresponding to engine throttle valve position.

7. Automatic transmission in accordance with claim 1 in which the last mentioned means is valve means including a valve body having a first port supplied with a hydraulic pressure, a second port connected with said return line and a third port adapted to be connected with a hydraulic fluid reseavoir, a first valve member for selectively establishing communication of said second port alternatively with said first and second ports, a second valve member adapted to be connected with engine throttle valve so as to be operated together with the throttle valve, and a spring disposed between said first and second valve members, whereby there is produced in the second port a pressure corresponding to engine throttle valve position.

8. Automatic transmission in accordance with claim 7 which further includes modulator valve means for producing a pressure which is sustantially proportional to but higher than said pressure corresponding to the engine throttle valve position.

* * * * *